United States Patent
Van Boxtel

(10) Patent No.: US 6,719,521 B1
(45) Date of Patent: Apr. 13, 2004

(54) HAND TRUCK PROVIDED WITH A PUSHER PLATE FOR PUSHING A LOAD OFF A PLATFORM

(76) Inventor: Leonardus Johannes Josephus Van Boxtel, Kloosterstraat 32, NL-5051, RD GOIRLE (NL)

(*) Notice: Subject to any disclaimer, the term of this patent is extended or adjusted under 35 U.S.C. 154(b) by 37 days.

(21) Appl. No.: 10/088,386
(22) PCT Filed: Sep. 13, 2000
(86) PCT No.: PCT/NL00/00652
§ 371 (c)(1), (2), (4) Date: Mar. 14, 2002
(87) PCT Pub. No.: WO01/19658
PCT Pub. Date: Mar. 22, 2001

(30) Foreign Application Priority Data

Sep. 15, 1999 (NL) .............................. 1013048

(51) Int. Cl.⁷ ................................................ B62B 1/14
(52) U.S. Cl. .................................. 414/490; 280/47.27
(58) Field of Search ................................ 414/490, 444, 414/461; 280/47.21, 47.24, 47.27, 47.28, 47.29

(56) References Cited

U.S. PATENT DOCUMENTS

| | | | |
|---|---|---|---|
| 1,710,893 A | * 4/1929 | Phillips | ...................... 414/490 |
| 2,240,355 A | 4/1941 | Swimley | |
| 2,452,258 A | * 10/1948 | Nielsen | ...................... 414/490 |
| 2,838,193 A | * 6/1958 | Statton | ...................... 414/490 |
| 2,953,267 A | * 9/1960 | Gorman | ...................... 414/490 |
| 3,403,800 A | * 10/1968 | Botello | ...................... 414/490 |
| 3,844,431 A | 10/1974 | Crawford | |
| 3,878,958 A | * 4/1975 | Ring | .......................... 414/490 |
| 4,355,941 A | 10/1982 | Lehman | |
| 5,290,051 A | * 3/1994 | Olson | ...................... 280/47.27 |
| 5,599,156 A | 2/1997 | Layne et al. | |
| 5,971,693 A | * 10/1999 | Story et al. | .................. 414/490 |
| 6,227,789 B1 | * 5/2001 | Williamson | .................. 414/490 |

FOREIGN PATENT DOCUMENTS

CH 344952 * 4/1960 .................. 414/490

* cited by examiner

Primary Examiner—Dean J. Kramer
(74) Attorney, Agent, or Firm—Heller Ehrman White & McAuliffe LLP

(57) ABSTRACT

A hand truck is provided with a pusher plate for pushing a load off its platform. In one embodiment, the hand truck comprises a frame to which the platform for accommodating a load and the wheels are attached and the operating construction is hingeably connected to the frame, wherein the pusher plate on one side is hingeably connected to the first end of the operating construction and on the other side is hingeably connected to the frame via an auxiliary arm. The operating construction extends from a first end close to the platform to handles, for grasping the hand truck with the hands. The pusher plate can be moved across the platform, for pushing a load placed on the platform off the platform.

16 Claims, 3 Drawing Sheets

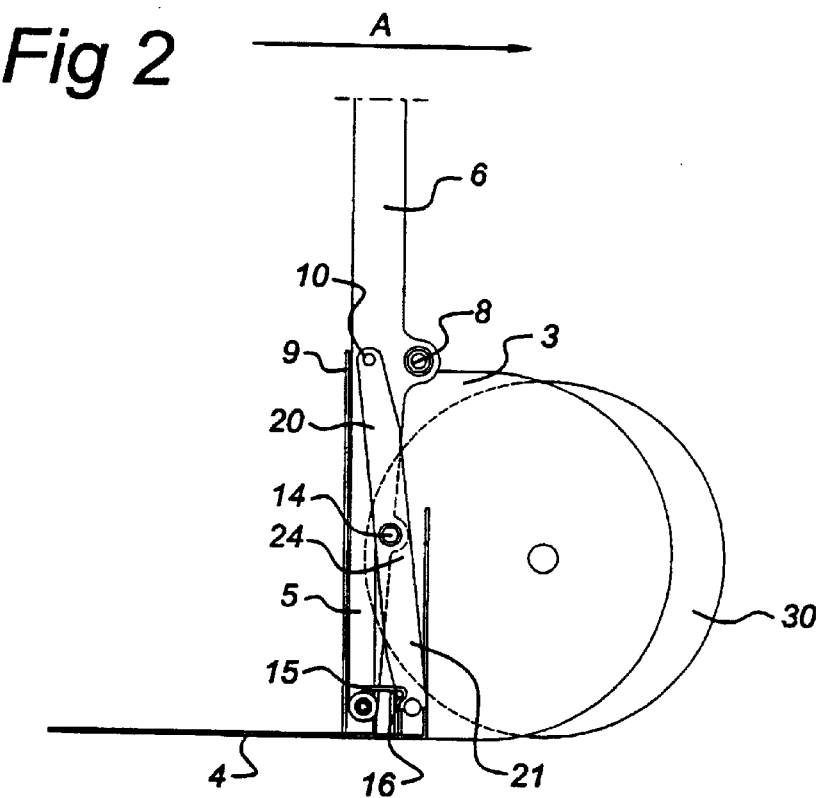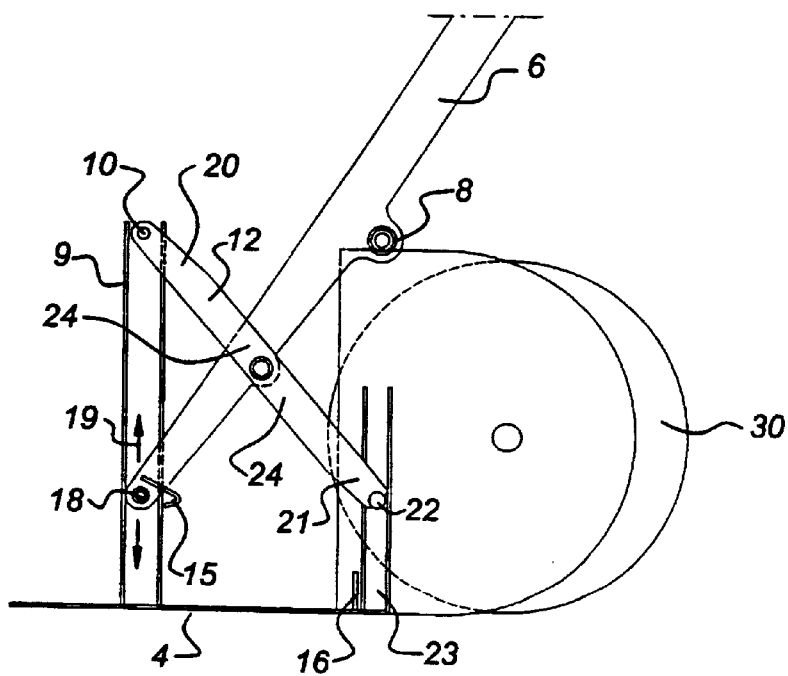

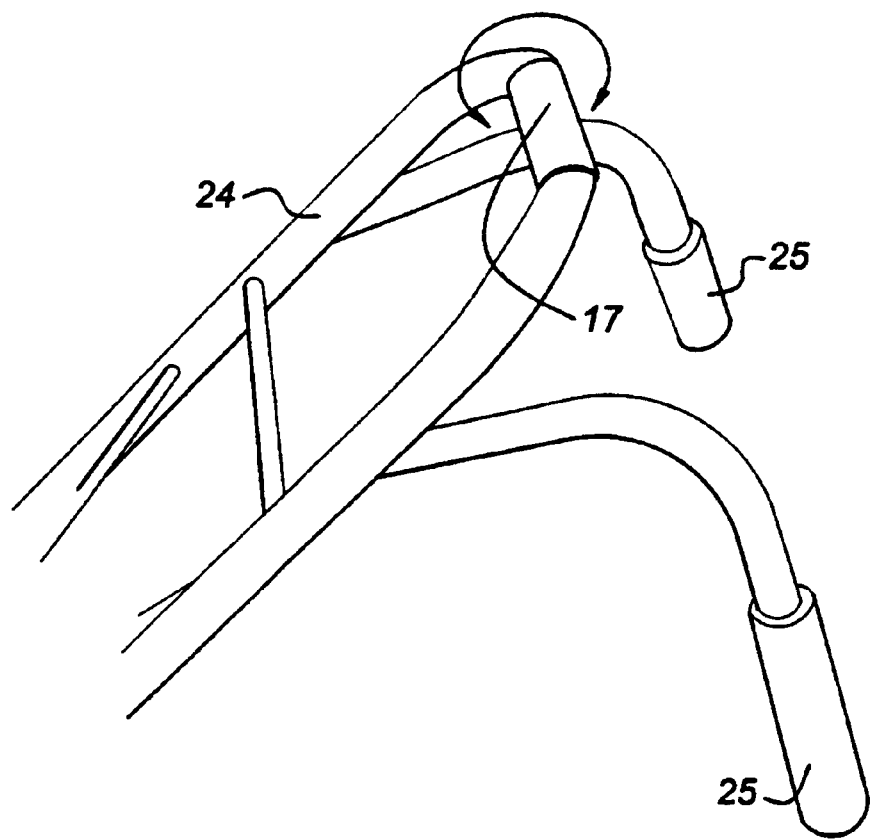

HAND TRUCK PROVIDED WITH A PUSHER PLATE FOR PUSHING A LOAD OFF A PLATFORM

The present invention relates to a hand truck for moving a load by hand, provided with a platform for accommodating a load, an operating construction that extends from a first end close to the platform to handles, for grasping the hand truck with the hands, and wheels for moving the hand truck, wherein the hand truck further comprises a pusher plate which can be moved across the platform, for pushing a load placed on the platform off said platform.

A hand truck of the type mentioned in the preamble is known from the prior art. Such a hand truck is disclosed, inter alia, in U.S. Pat. No. 3,844,431. This U.S. patent discloses a hand truck which is provided with a pusher plate that is connected with the aid of arms to the operating construction of the hand truck. The pusher plate can be moved across the surface of the platform by actuating a control element using a foot. Because the element has to be operated by foot, the user is pushed backwards. That is to say the user has to hop backwards on one foot whilst he/she operates the control element with the other foot.

Another variant of a hand truck of the type mentioned in the preamble is disclosed in U.S. Pat. No. 5,599,156. According to this US document the hand truck comprises a first bracket which is provided at the bottom with a platform and with wheels. The pusher plate can be activated with the aid of a second bracket. The second bracket is operated by hand. That is to say there are in fact two operating constructions which extend over virtually the entire length of the hand truck. The presence of the two operating constructions makes the hand truck not only expensive but also heavy. Furthermore, the pivot point about which the second bracket pivots moves downwards towards the pusher plate when the second bracket is actuated. Therefore the user has to bend down a long way when he/she wishes to actuate the pusher plate.

In view of the above, the aim of the present invention is to provide a hand truck of the type mentioned in the preamble with the construction of which the hand truck can be kept relatively simple so that the hand truck itself can be made relatively lightweight and inexpensive.

This aim is achieved in the present invention in that the hand truck comprises a frame to which the platform and the wheels are attached and in that the operating construction is hingeably connected to said frame, wherein the pusher plate on one side is hingeably connected to the first end of the operating construction and on the other side is hingeably connected to the frame via an auxiliary arm.

What is achieved as a result of the fact that the operating construction is able to pivot about the frame and the fact that the hub plate is connected to the end of the operating construction is that the pusher plate can be moved across the platform with an advantageous lever ratio. Furthermore, it is ensured that only a single embodiment of the operating construction is needed and the pusher plate can nevertheless be moved by hand over the surface of the platform. This means that the hand truck according to the invention is easy to operate and, moreover, is relatively lightweight.

According to the invention it is possible for the hand truck to comprise locking means for impeding the hinging movement of the operating construction with respect to the frame, as desired.

What is achieved as a result of this measure is that the hand truck can be used with locking engaged, that is to say safely, for moving loads. When the load has reached its destination, the locking is released and the pusher plate can be activated.

Furthermore, it is possible for the operating construction to be attached to the frame via a first axis, the top edge of the pusher plate being attached such that it can pivot about a second axis parallel to the first-mentioned axis, to the one ends of two parallel legs of an auxiliary frame, the other ends of which are provided with guide elements which run in guide paths in or on the said frame parts, the legs of said auxiliary frame being fixed between the two ends such that they can pivot about a third axis parallel to the first-mentioned axis, to the legs of the operating construction, and for the said bottom ends of the operating construction to be provided with guide elements which run in guide paths in or on the side edges of the pusher plate.

By means of this construction it is ensured that the pusher plate always remains in a position essentially at right angles to the platform, irrespective of the position of the operating construction. As a result, and because the pusher plate has a large surface area, the force of the pusher plate acts on a larger surface of the goods and these will less rapidly become deformed and damaged.

In a preferred embodiment the wheels can each rotate about a common axis. It is also preferred that the guide elements on the auxiliary frame and on the operating construction are positioned on respective fourth and fifth axes which run parallel to the axes already mentioned.

In order to keep the hand truck as simple as possible, it is preferable that the distance between the second and the third axes is equal to the distance between the third and the fifth axes. In this context it is also advantageous that the distance between the first and the third axes is equal to the distance between the third and the fourth axes.

To provide the hand truck with adequate robustness, it is preferable that the operating construction is provided with at least one transverse element by means of which its said legs are attached to one another. Furthermore, the auxiliary frame can be provided with at least one transverse element by means of which the said legs thereof are attached to one another.

To ensure that the goods are not accidentally pushed off the platform during transport, it is important that the hand truck is provided with a locking mechanism by means of which the pusher plate can be locked in one of the extreme positions, which locking mechanism is coupled to a control mechanism that is located on the operating construction, the coupling components between the locking mechanism and the control mechanism being located in hollow parts of the operating construction. On ergonomic grounds it is desirable that the control mechanism is so positioned that it is easily accessible to the user.

In a preferred embodiment the pusher plate is constructed as a flat plate with flanged edges. Furthermore, the pusher plate is constructed as a preformed plate such that the pivot points about the second and fifth axes have been retained and/or all said axes run parallel.

It can be advantageous to shape the pusher plate in such a way that certain goods can be pushed off the platform more easily. In this context consideration can be given, for example, to a concave pusher plate which is particularly suitable for pushing off casks.

The invention will be explained in more detail below with reference to a preferred embodiment and the appended drawing, in which:

FIG. 2 shows a cross-section of the embodiment in FIG. 1, where the hand truck is in the position which is suitable for transporting products;

FIG. 3 shows the same cross-section as in FIG. 2, but where the hand truck is in the position in which the pusher plate has been pushed some distance across the platform.

Figure 1:
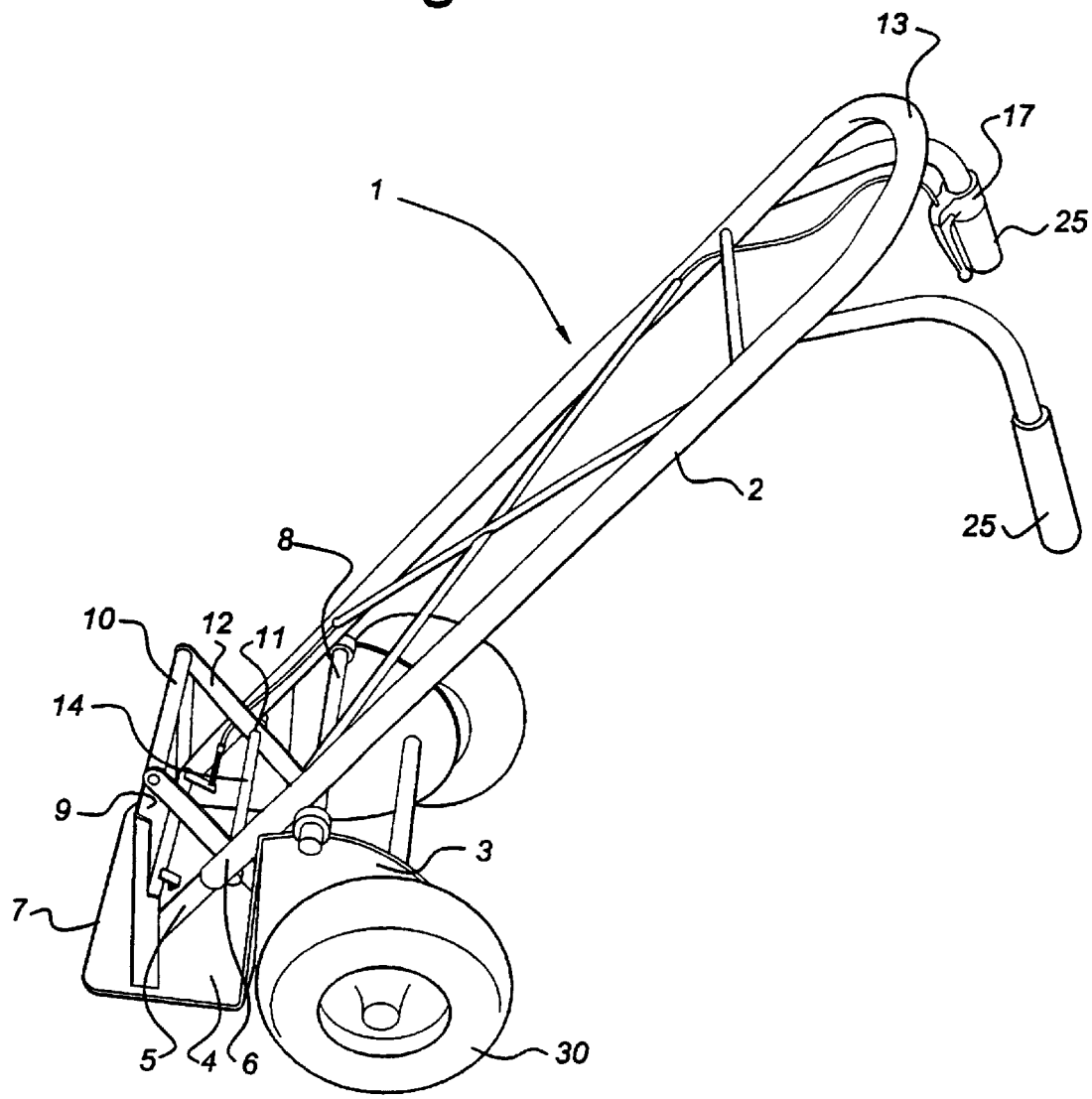
FIG. 1 shows an oblique side view of said preferred embodiment.

An embodiment of a hand truck according to the present invention is shown in FIG. 1. The hand truck comprises a first part with the platform 4, the wheels 30 and the frame 3. The operating construction 2 is also fixed to the frame 3 via a pivot pin 8. The pusher plate 9 is located at the bottom of the operating construction 2. In the position of the hand truck 1 shown, the operating construction 2 is in a position in which it slopes backwards, whilst the frame parts 3 are in a position which these would assume when a load has been placed on the platform 4. In this position the platform 4 and the wheels connected to the frame part 3 are resting on the ground.

Because the pusher plate extends essentially at right angles to the platform 4, a uniform force is exerted on the products on said platform. In the case of stacks of loose goods, the risk of the stacks being pushed over is reduced by the large surface area of the plate.

As can be seen, the operating construction 2 does not have to be pulled a long way to the rear in order to cause the pusher plate 9 to make a complete sweep over the platform 4. What is achieved as a result of this limited sweep is that the top end 13 of the operating construction 2 drops down only a slight distance when unloading. This has the major advantage that making the movement required for unloading is less tiring, because the user does not have to bend forwards. This will be found to be a significant advantage, especially in the case of frequent use.

Because the operating construction 2 is pulled backwards when unloading, the bottom ends 5 of the legs 6 thereof are moved towards the front 7 of the platform 4. During this movement the operating construction 2 pivots about a pin 8, which corresponds to the first axis. As a result of the movement of the bottom ends 5 of the legs 6, the pusher plate 9 connected thereto is also moved forward. Because the connection between said bottom ends 5 and the pusher plate 9 is a linear guide 18 (see FIG. 3), the pusher plate 9 is not forced upwards, if it is in its vertical position.

In order to keep the pusher plate 9 in its vertical position, this plate is hingeably attached, at the top thereof, to an auxiliary frame 11. Their common pivot pin 10 corresponds to the second axis, which runs essentially parallel to the first axis. The legs 12 of the auxiliary frame 11 are connected by their other end to the frame part 3, via a linear guide 23 (see FIG. 3). In their mid region the legs 12 are hingeably connected via a pin 14, corresponding to the third axis, to the operating construction 2. The mechanism that keeps the pusher plate 9 in its upright position will now be discussed in more detail with reference to FIGS. 2 and 3.

In the position shown in FIG. 2 the hand truck functions completely like a normal hand truck which does not have a pushing-off device. The platform 4 extends essentially at right angles to the legs 6 of the operating construction 2 and can be loaded in the normal way. To prevent the legs 6 pivoting about the pivot pin 8 with respect to the frame part 3, the locking element 15 engages on a stop 16. The locking element 15 can be raised by means of the handle 17 shown in FIG. 1, as a result of which it no longer engages on the stop 16. By now moving the operating construction 2 in the direction of arrow A, the operating construction 2 will hinge with respect to the frame part 3.

Because the operating construction 2 moves about the pivot pin 8, the bottom end 5 thereof will move in the opposing direction. To ensure that the pusher plate 9 is not lifted by the operating construction 2, the connection between said construction 2 and said plate 9 is a linear guide, consisting of a roller 18 in an elongated guide 19. To ensure that the pusher plate 9 remains vertical, the legs 12 of the auxiliary frame 11 are attached to said plate 9. Said legs 12 are attached to the pusher plate 9 by their first ends 20, such that they can hinge about the pin 10. Their other ends 21 are connected via rollers 22, which are accommodated in a guide 23, to the frame part 3. In its mid region 24 the auxiliary frame 11 is connected to the operating construction 2 such that it can hinge about the pin 14. This construction ensures that the pusher plate 9 remains vertical in every position of the operating construction 2, as a result of which the desired characteristics are obtained.

The ratio between the distance that the operating construction 2 has to be moved backwards and the distance that the pusher plate 9 moves over the platform 4 to a large extent depends on the distances between the axes 8, 10, 14, 18, 22. The choice of these distances also depends on the force that is needed to push the goods off the platform.

Another embodiment of the operating construction is shown in FIG. 4. In this embodiment the handle has been replaced by a rotary control 17 and the control mechanism, in this case a cable, which cannot be seen, runs inside the tube 24 of the operating construction 2. The locking element 15 can be released from the stop 16 by turning the rotary control 17 in the direction shown. The advantage of this embodiment is that the hand grips 25 do not have to be held when tilting the operating construction 2. As a result the user can remain upright, which has ergonomic advantages.

What is claimed is:

1. A hand truck comprising:

a platform for accommodating a load, a frame attached to the platform, a pair of wheels rotatably attached to the frame, an operating construction hingably attached to the frame and extending from a first end comprising a pair of legs having bottom ends close to the platform to a second end comprising a pair of handles, and a pusher plate, perpendicular to the platform, that can be moved across the platform from a rear to a front thereof, a bottom edge of the pusher plate being hingably connected to the first end of the operating construction and a top edge of the pusher plate being hingably connected to the frame by an auxiliary frame, the frame has guide paths therein or thereon, the operating construction is hingably attached to the frame on a first axis, and the bottom ends of the legs of the operating construction are provided with guide elements, the pusher plate has guide paths in or on each side edge of the pusher plate, in which the guide elements at the bottom ends of the legs of the operating construction run, and the top edge of the pusher plate is provided with a second axis parallel to the first axis, top ends of a pair of parallel auxiliary arms of the auxiliary frame are pivotably fixed on the second axis, bottom ends of each of the auxiliary arms are provided with guide elements, and the auxiliary arms are pivotably fixed to the legs of the operating construction on a third axis parallel to the first and second axes.

2. The hand truck of claim 1 where the guide elements on the auxiliary frame and the guide elements on the legs of the operating construction are positioned on fourth and fifth axes, respectively, and these axes are parallel to the first three axes.

3. The hand truck of claim 2 where the distance between the second and third axes is equal to the distance between the third and fifth axes.

4. The hand truck of claim 2 where the distance between the first and third axes is equal to the distance between the third and fourth axes.

5. The hand truck of claim 2 where the pusher plate is constructed as a preformed plate defining pivot points of the second and fifth axes.

6. The hand truck of claim 1 where the operating construction is provided with at least one transverse element attaching the legs of the operating construction to one another.

7. The hand truck of claim 1 where the auxiliary frame is provided with at least one transverse element attaching the legs of the auxiliary frame to one another.

8. The hand truck of claim 1 further comprising a locking mechanism for locking the pusher plate at the rear of the platform.

9. The hand truck of claim 1 where the wheels rotate on a common axis.

10. The hand truck of claim 1 where the pusher plate is a flat plate with flanged edges.

11. The hand truck of claim 1 for the conveyance of goods having a certain shape where the shape of the pusher plate complements the shape of the goods to facilitate pushing of such goods off the platform.

12. The hand truck of claim 1 further comprising a locking mechanism for locking the pusher plate ear of the platform,
wherein the locking mechanism is coupled to a control mechanism therefor located on the operating construction by coupling components located in hollow parts of the operating construction.

13. A hand truck comprising:
a platform for accommodating a load,
a frame attached to the platform,
a pair of wheels rotatably attached to the frame,
an operating construction hingably attached to the frame and extending from a first end comprising a pair of legs having bottom ends close to the platform to a second end comprising a pair of handles,
a pusher plate, perpendicular to the platform, that can be moved across the platform from a rear to a front thereof, a bottom edge of the pusher plate being hingably connected to the first end of the operating construction and a top edge of the pusher plate being hingably connected to the frame by an auxiliary frame, and
a locking mechanism for locking the pusher plate at the rear of the platform,
wherein the locking mechanism is coupled to a control mechanism therefor located on the operating construction by coupling components located in hollow parts of the operating construction.

14. The hand truck of claim 13 where the wheels rotate on a common axis.

15. The hand truck of claim 13 where the pusher plate is a flat plate with flanged edges.

16. The hand truck of claim 13 for the conveyance of goods having a certain shape where the shape of the pusher plate complements the shape of the goods to facilitate pushing of such goods off the platform.

* * * * *